3,598,570
STEELMAKING PROCESS
Kokichi Otani, 14–26 3-chome, Hiroo,
Shibuya-ku, Tokyo, Japan
No Drawing. Continuation-in-part of application Ser. No.
658,587, Aug. 7, 1967. This application July 29,
1970, Ser. No. 59,372
Claims priority, application Japan, Aug. 12, 1966,
41/52,596; Jan. 19, 1967, 42/3,332; Jan. 20,
1967, 42/3,639; Feb. 27, 1967, 42/12,073
Int. Cl. C21c 5/00, 5/52
U.S. Cl. 75—43                                    9 Claims

ABSTRACT OF THE DISCLOSURE

A steelmaking process giving remarkably high production rate and high yield by the introduction into the furnace, either electric or open-hearth, of heavy oil or other readily available reducing-gas-forming material. The furnace in operation is filled with reducing flames enabling fully effective reduction and thus the blowing into the furnace of a large quantity of oxygen gas is permitted without the danger of excessive oxidation. Solid carbon material may also be added to the charge.

---

This is a continuation-in-part of my prior application Ser. No. 658,587, filed Aug. 7, 1967, now abandoned.

This invention relates generally to the manufacture of steel including the making of alloy steels and has for its object to provide a new and improved steelmaking process in particular designed to reduce the time requirement for each cycle of steel making operation or the total charge-to-tap time, and to raise the yield of steel production while improving the quality or steel produced or at least maintaining it at a usual level.

Generally, in steelmaking, both oxidation refining and reduction refining are performed. For example, in electric furnace steelmaking, oxidation refining is performed as the first stage of the process, employing oxygen or hematite ore as the major source of oxygen, and at the second stage lime and breeze are employed to form a basic carbidic slag for reduction of the molten bath through its surface. Finally, some ladle deoxidation employing such deoxidizers as ferrosilicon, ferromanganese and aluminum is required for production of high grade steels. The supply of oxygen effected under ordinary pressure by lance is principally intended only to serve the purposes of cutting the scrap to expedite its melting and of oxidizing the carbon contained for its removal or decarburization. In addition, the cutting effect of such oxygen has been limited and use of oxygen in any larger quantities has caused excessive oxidation, uselessly forming iron oxide, $Fe_2O_3$, which partly escapes into the external atmosphere as red fume and partly enters the slag on the bath to impair the yield of steel production. The excessive oxidation also makes the reduction of the bath extremely difficult, resulting in a substantial increase of production cost. In fact, it is impossible to obtain any satisfactory killed steel free of blowholes from the molten bath once oxidized in excess even if large quantities of deoxidizer are used.

In the open hearth process, usually heavy oil or a mixture of natural gas and oxygen is introduced into the furnace by burner means as a main source of heat. The oxidation refining is effected by the use of preheated air, oxygen gas blown in by lance or hematite and the reduction refining follows which is effected in substantially the same fashion as with the case of electric furnace steelmaking. As is well known, the open hearth furnace includes a regenerative system to improve the heat economy of the furnace, which efficiently provides highly heated gases and an accordingly elevated temperature in the furnace. Even with such system, however, it has been difficult to obtain white heat gases in the furnace and the furnace temperature has been limited, giving a relatively long charge-to-tap time.

Further, in conventional steelmaking processes, use of any large quantity of oxygen gas has caused severe consumption of the refractory materials forming the furnace roof and walls and electrodes on account of the intensified oxidizing effect of the supply of oxygen and this situation has naturally formed another factor limiting the use of oxygen in conventional processes other than the converter steelmaking.

In view of the above, the present invention is designed to attain the intended purpose with different types of steelmaking furnaces by making it feasible to introduce a large quantity of oxygen into the furnace under high pressure and proposes to introduce a suitable amount of hydrocarbon-base reducing-gas-forming material such as heavy oil or kerosene into the furnace with the intention of filling the furnace with reducing flames thereby to afford a satisfactory reduction effect while precluding any excessive oxidation of the charged material.

As is well known, in converter steelmaking, a large volume of oxygen gas is blown into the bath to effect vigorous oxidation refining resulting in higher production rates. This is possible because of the deoxidizing reactions occurring owing to the substantial carbon content of the hot metal charged. In the steelmaking process according to the present invention, a suitable reducing-gas-forming agent is introduced into the electric, open hearth or other steelmaking furnace with the object of making such agent play the same role as that of the carbon content of hot metal charged in the converter. Thus, according to the present invention, introduction of a large quantity of oxygen into the furnace under high pressure is made possible by forming inside the furnace reducing gases such as carbon monoxide gas in quantities sufficient to fill the furnace with a hot reducing atmosphere and such formation of reducing gases is attainable, for example, by sprinkling a sufficient amount of heavy oil, kerosene or other readily available and inexpensive hydrocarbon-base reducing-gas-forming agent over the charged materials such as scrap and lime to place them in an oil-immersed state or, in the case of an electric arc furnace, by blowing such reducing-gas-forming agent into the furnace region exposed to the intense arc heat.

In this connection, attention must particularly be called to the fact that the use of oil is entirely different from that in any conventional steel making process in principle as well as in effect. Heretofore, for example, in the open hearth process, heavy oil has been introduced into the furnace by burner means solely as a fuel forming the major source of heat together with air and, if desired, additionally with oxygen gas. In electric furnace steelmaking, introduction of some heavy oil has previously been attempted and, particularly for the use of heavy oil in combination with oxygen gas, a variety of devices have been proposed in relation to the mixing proportion, feed pressure, and atomizing means; all of these devices, however, have been contemplated particularly in the interests of the combustion efficiency and thermal effect of heavy oil as an auxiliary source of heat. In contrast, the use of heavy fuel oil or the like in the process according to the present invention is intended to serve the purpose of making a reducing furnace atmosphere thereby to enable use of oxygen gas in large quantities just as under the effect of the carbon content of hot metal featuring the converter steelmaking process.

The introduction of a large quantity of oxygen gas into the furnace can be performed under high pressure by lance or through bored electrodes, intended to the purpose, and such oxygen not only serves to effect decarburization of the charge and removal of different impurities therefrom by their oxidation but also is effective to heat the furnace interior to an extraordinarily high temperature, and, acting to cut the scrap with increased efficiency, expedites the melting process to a remarkable extent. Hence, an unobvious result of increased production is obtained by the present invention by use of large volumes of oxygen in the new process disclosed.

Further, under the effect of reducing gases used in combination with such oxygen supply, oxygen and other oxidizing gases in the molten steel can be completely removed therefrom, and oxides in the scrap including ore and scale effectively reduced under high heat. This enables even weather-beaten heavily rusted scrap, cheap low-grade iron scrap such as short turning chips or even ore to be melted rapidly and reduced for production with high yield.

It is to be noted that the process of the present invention has, among others, the following practical advantages. The effect of reducing gases to preclude excessive oxidation of the bath is enough to reduce or eliminate the need for dust-collecting facilities ordinarily used to deal with the fume gases from the furnace and the reducing effect of the furnace atmosphere prevents any severe consumption of the furnace materials and electrodes due to their oxidation. In addition, because of the high heat obtainable inside the furnace, and other features of the invention, the unexpected result that the electric power consumption, if the furnace used is electric, can be substantially reduced is obtained; and even with a transformer of limited capacity and relatively low secondary voltage, the melting time can be effectively reduced.

The reducing-gas-forming agent usable in the process of the present invention can be freely selected from a wide variety of commercially available hydrocarbon-base materials including commercial heavy fuel oils, kerosene, light fuel oils and other petroleum products. Those products having higher octane numbers need be handled with particular care but are intense in their effect; and among others, kerosene is recommendable since it is cheap, less dangerous to handle than gasoline and lower in sulphur content than heavy oil.

INVENTIVE SUBJECT MATTER

This invention relates to a rapid melting steel making process by melting a charge scrap in an immersed or mixed state with a predetermined amount of liquid hydrocarbon-base reducing-gas-forming agent comprising liquid hydrocarbon with or without the presence of a solid carbon material, and blowwing predetermined amounts of oxygen gas into the furnace to expedite the melting process without involving any excessive oxidation in the metal bath.

Description will now be made in further detail of the process of the present invention as applied to electric furnace steel-making.

It is to be noted that the purpose of employing hydrocarbon-base reducing-gas-forming material in the process of the invention is to form in the furnace a reducing atmosphere that enables use of oxygen in large quantities without involving the danger of excessive oxidation of the furnace charge, though the use of such hydrocarbon material also has the effect of furnishing an additional source of heat supply to the furnace, allowing an ample supply of oxygen. It is to be understood that the hydrocarbon and oxygen gas are fed into the furnace separately from each other and not intended for use as ordinary fuel materials usable through burner means. In other words, according to the present invention, the hydrocarbon oil and oxygen gas are fed into the furnace in a manner such as to react to evolve heat in or adjacent to the furnace charge and thus aid in raising its temperature at a high rate with no substantial heat loss. For, example, with a 1-ton electric arc furnace, it has been found that, when kerosene is introduced in an amount of about 0.5 to 3 liters (about 0.4–2.4 kg.), preferably 1.2–1.8 (about 1.0–1.6 kg.) per ton of charge, oxygen gas can be fed with success into the furnace in an amount as large as from 10.8 to 45 $Nm.^3$, preferably 20–25 $Nm.^3$ (cubic meters, normal) per ton of charge produced in contrast with the conventionally feasible limit of about 10.8 $Nm.^3$/ton.

As described hereinbefore in brief, melting and refining of the charge can be sped up under the high heat obtained with the supply of a large quantity of high pressure oxygen gas, which is made feasible by the introduction into the furnace of a suitable amount of heavy oil, kerosene or other hydrocarbon-base reducing-gas-forming agent effective to fill the furnace with reducing gases formed therefrom, and gas reduction is effected under such ample supply of reducing gases accompanying the melt and refining process.

Ordinarily, at the start of the reducing period, lime and breeze or coke dust are added to the bath to form a basic carbidic slag, which reacts with the bath through its surface for reduction refining. In the past, however, it has been generally supposed that carbon monoxide gas entering the interior of the bath causes blowholes and thus makes it difficult to produce high quality steel ingots. Accordingly, the operator of the furnace could not be bold enough to supply any large quantity of CO gas to the bath during the reducing period and major efforts have been directed to the finding of some way or other of forming a satisfactory slag.

In this situation, the inventor proposes full use of reducing gases during the reduction refining period following the oxidation refining not only by supplying those gases to the surface of the molten steel but also letting them to form in the bath and diffuse into its interior. To this end, for example, coke or coal in powder form is led into or placed in the bath for reaction with its contents to form CO gas. In practice, the coke or coal powder may, for example, be enclosed in suitable, easily broken or ignitable capsules and such encapsulated carbon containing material is laid on the furnace bottom immediately before the charging of steelmaking materials or thrown into the bath being refined to form CO gas therein for gas reduction of the melt. It is to be readily understood that the same effect can also be obtained by blowing a hydrocarbon-base oil such as heavy fuel oil or kerosene into the bath or employing charcoal pig iron as a charge material containing, or for forming, reducing gases such as CO.

Previously, gas reduction has been intended to aid the reduction process principally through reactions of the gases with the slag. In contrast, according to the present invention, not only the oxidation refining can be made vigorous without involving the danger of excessive oxidation of the charge but also the furnace operation during the reduction period can be materially improved and expedited with a direct and highly efficient refining effect upon the bath.

Incidentally, it has been ascertained that in the reduction refining according to the present invention any excess of reducing gases formed in the molten steel under high pressure and high heat is released from the metal as it is solidified.

Subsequently, in the killing stage of the inventive process, it should be noted that use of only limited quantities of deoxidizers is required since the molten steel now includes only a limited oxygen content owing to the previous effective deoxidizing reactions, and accordingly segregation of impurities is minimized.

In the past, production of killed steel has involved use of considerable quantities of deoxidixers such as aluminum, ferromanganese and ferrosilicon for forced killing of the molten bath immediately before or after it is tapped on account of insufficient reduction previously effected. Such deoxidizers have formed complex impurities causing segregation in the steel particularly when the atmosphere is highly oxidizing. Such segregation or concentration of impurities, of course, forms a major factor of impairing the quality of steel ingots and the limited ductility of such ingots and particularly the brittleness of their core portion make it difficult to obtain any high quality rolled products. In contrast, according to the present invention, steel ingots are obtainable which are substantially free from defects such as segregation and blowholes and more than comparable to vacuum cast products and even high tension steels can be manufactured with efficiency.

The increased qualities of steel products obtainable by the process of the present invention have been demonstrated by testings conducted by the inventor. For example, the results of the bending tests conducted with test pieces, 22 mm. x 19 mm. in section, of electric furnace products were all satisfactory; it is particularly remarkable that in the 180° close bending tests, no cracks were observed in any pieces tested even on their back surface stretched most severely.

Application of the inventive process to the open hearth steelmaking will next be described.

In this application, reducing gases can be formed in the furnace simply by employing charge materials including scrap preliminarily added or mixed with a suitable hydrocarbon-base material such as heavy oil or kerosene thereby to fill the furnace interior with a hot reducing atmosphere while on the other hand introducing a large quantity of oxygen gas by lance forced into the reducing atmosphere of the furnace for melting the charged materials at an increase rate. This procedure, in combination with the introduction of fuel as a heat source by burner means, which is peculiar to the open hearth furnace, enables its operation under extraordinarily high heat and thus reducing the length of melting time to a striking and unexpected extent, makes it possible to produce steel of good, or even better, quality at lower costs.

Listed below are operation data of the inventive and conventional steelmaking processes obtained in practice with ordinary 10-ton, 25-ton and 45-ton electric-arc furnaces employing usual charge materials.

low secondary voltage, the time of steelmaking operation according to the inventive process was less than two hours in contrast with about four hours required by the conventional process. This clearly indicates the tremendous industrial value of the present invention.

Next, the yield of steel production will be compared between the conventional and inventive processes from the results obtained in this production of 80-kg. SK4 steel ingots by use of the same 10-ton electric furnace shown in the above tables, which had an inside diameter of 2,720 mm.

EXAMPLES OF YIELD BY CONVENTIONAL PROCESS (A)

Charge, kg.:
  Short turning chips of iron casting _____ [1] 4,480
  Steel scrap _____ 6,720

Total _____ 11,200

Total weight of ingots produced, kg. _____ 8,620
Yield, percent _____ Ab. 77

(B)

Charge, kg.:
  Short turning chips of iron castings _____ [2] 2,250
  Steel scrap _____ 8,760

Total _____ 11,010

Total weight of ingots produced, kg. _____ 8,910
Yield, percent _____ Ab. 81

(C)

Charge, kg.:
  Pig iron _____ 600
  Steel scrap _____ 10,200

Total _____ 10,800

Total weight of ingots produced, kg. _____ 9,150
Yield, percent _____ Ab. 85

[1] Ab. 40%.
[2] Ab. 20%.

EXAMPLES OF OPERATION ACCORDING TO THE INVENTIVE PROCESS

[10-ton electric furnace: Transformer rating, 5,000 kva. Secondary voltage, 240~110 volts]

| No. of heat | Kind of steel (JIS) | Melting time Hr. | Melting time Min. | Total steelmaking time Hr. | Total steelmaking time Min. | Total scrap charge, kg. | Molten steel, kg. | Power consumption, Kw.-hr. per ton of— Molten steel | Power consumption, Kw.-hr. per ton of— Product | Oxygen consumption, Nm.$^3$ per ton of charge Melting period | Oxygen consumption, Nm.$^3$ per ton of charge Oxidizing period | Kerosene consumption, liters per charge |
|---|---|---|---|---|---|---|---|---|---|---|---|---|
| 1 | S45C | | 35 | 1 | 20 | 8,500 | 8,000 | 440 | 470 | 5.0 | 12.5 | 15 |
| 2 | S45C | | 50 | 1 | 30 | 8,800 | 8,300 | 449 | 480 | 4.8 | 6.0 | 15 |
| 3 | S45C | | 50 | 1 | 25 | 8,700 | 8,200 | 451 | 481 | 4.9 | 9.8 | 15 |

[25-ton electric furnace: Transformer rating, 8,000 kva. Secondary voltage, 270~120 volts]

| 1 | NK | | 55 | 1 | 30 | 30,200 | 27,400 | 431 | 461 | 17.5 | 9.6 | 40 |
| 2 | NK | 1 | 05 | 1 | 30 | 29,200 | 25,650 | 476 | 494 | 18.1 | 6.3 | 40 |
| 3 | NK | | 55 | 1 | 30 | 30,000 | 26,960 | 432 | 472 | 17.0 | 7.8 | 40 |

[45-ton electric furnace: Transformer rating, 15,000 kva. Secondary voltage, 340~127 volts]

| 1 | SM41A | 1 | 00 | 1 | 40 | 46,500 | 42,350 | 448 | 459 | 16.5 | 7.3 | 60 |
| 2 | SS41 | 1 | 05 | 1 | 45 | 46,500 | 42,650 | 433 | 441 | 17.2 | 8.4 | 60 |
| 3 | SS41 | 1 | 15 | 1 | 45 | 45,500 | 42,150 | 404 | 417 | 18.0 | 7.1 | 60 |

EXAMPLES OF OPERATION ACCORDING TO THE CONVENTIONAL PROCESS

[With the same furnaces as the above]

| Furnace | Kind of steel (JIS) | Melting time Hr. | Melting time Min. | Total steelmaking time Hr. | Total steelmaking time Min. | Total scrap charge, kg. | Molten steel, kg. | Power consumption, Kw.-hr. per ton of— Molten steel | Power consumption, Kw.-hr. per ton of— Product | Oxygen consumption, Nm.$^3$ per ton of charge Melting period | Oxygen consumption, Nm.$^3$ per ton of charge Oxidizing period | Kerosene consumption |
|---|---|---|---|---|---|---|---|---|---|---|---|---|
| 10-ton | S45 | 2 | 30 | 4 | 05 | 10,600 | 9,600 | 865 | 865 | 0 | 10 | |
| 25-ton | NK | 2 | 50 | 3 | 55 | 29,200 | 27,300 | 623 | 640 | 1 | 8 | |
| 45-ton | NK | 3 | 00 | 3 | 55 | 52,300 | 46,800 | 532 | 546 | 1 | 8 | |

As will readily be noticed by comparing these tables, the total steelmaking time can be reduced to about one-half of that usually required, by applying the process of the present invention. Although any of the electric furnaces was operated with a transformer limited in rating for the size of the furnace body and having a relatively The results obtained from the same charge by employing about 1.6 liters (1.3 kg.) of kerosene and 45 Nm.$^3$ of oxygen gas per ton of charge according to the present invention were as follows:

(A)

Charge, kg.:
Short turning chips of iron castings _____ [1] 4,450
Steel scrap _____ 6,740

Total _____ 11,190

Total weight of ingots produced, kg. _____ 9,830
Yield, percent _____ Ab. 86.9

(B)

Charge, kg.:
Short turning chips of iron castings ____ [2] 2,240
Steel scrap _____ 8,780

Total _____ 11,020

Total weight of ingots produced, kg. _____ 9,700
Yield, percent _____ Ab. 88.1

(C)

Charge, kg.:
Pig iron _____ 650
Steel scrap _____ 10,300

Total _____ 10,950

Total weight of ingots produced, kg. _____ 9,700
Yield, percent _____ Ab. 88.5

[1] Ab. 40%.
[2] Ab. 20%.

As will readily be observed, the increase in yield in Case A was 9.9%; in Case B, 7.1%; and in Case C, 3.5%. The amount of yield increase varies with the type of charge materials and other operating conditions but, from these and many other results of actual production performed by the inventor, it has been found that an increase in yield of the order of about 4% can readily be realized by application of the inventive process, giving a yield of from about 88% to 89%, compared to that previously obtained of from about 84% or at most 85%. Particularly, the fact that this increase in yield with lower grades of charge material is substantial is really another spectacular feature of the inventive process. Utilization, for example, of turning chips of iron castings is very desirable to steelmakers as they are readily available at extremely low costs compared to common pig iron or scrap for steelmaking.

From the practical examples shown in the specification and from other data, it is to be observed that good results can be obtained when from about 1.2 to about 1.8 liters (1.0 kg.–1.6 kg.), of hydrocarbon oil, such as kerosene or heavy or light fuel oil and about 8–30 kg., preferably 13–20 kg. of solid carbon such as coke dust per ton of charge are charged preliminarily in the furnace in mixture with scrap and about 10.8 to about 45 Nm.³ of oxygen per ton of charge is blown by lance after the melting has started and the furnace been filled with reducing gases. The oxygen is fed, of course, by conventional means at such a rate and under the pressure required as to supply it within the range of the total quantities stated. The solid carbon when used preferably is about 13 to 20 kg. per ton of charge but improved results are obtained over conventional practice when smaller or larger quantities of solid carbon within the larger range stated are used. The proportion of solid carbon material to liquid hydrocarbon oil is a range of from about 10:0.5 to 10:7, preferably about 10:2 (by weight).

The following examples show the invention when practiced and employing the mixtures of kerosene and coal having various compositions and 45 Nm.³ of oxygen gas per/ton of charge by means of 68-ton electric furnace;

| Ex. No. | Total charge (steel scrap), kg. | Carbon content | Reducing gas forming agent, kg. | | Molten steel, kg. | Yield percent |
|---|---|---|---|---|---|---|
| | | | Coal | Kerosene by weight | | |
| A | 1,645 | 0.34–0.39 | 15 | 1.1(10:0.73) | 1,500 | 91 |
| B | 1,945 | 0.55–0.60 | 18 | 1.3(10:0.74) | 1,800 | 92 |
| C | 2,145 | 0.80–0.85 | 20 | 1.5(10:0.73) | 2,000 | 93 |
| D | 2,045 | 0.67–0.73 | 19 | 1.4(10:0.75) | 1,900 | 92.5 |
| E | 1,445 | 0.13–0.17 | 13 | 0.94(10:0.75) | 1,300 | 90.0 |
| F | 1,445 | 0.14–0.18 | 13 | 0.94(10:0.75) | 1,300 | 90.0 |

The melting time required about 2 hours according to a process of this invention in contrast with the ordinary previously known process of about 4 hours. Good yield of product or ingot was obtained when a reducing-gas-forming agent having high proportion of liquid hydrocarbon to solid carbon material was used as the increase of carbon content of the starting material charged in spite of blowing large amount of oxygen gas into furnace to expedite the melting process without involving any excessive oxidation in the metal bath.

In conventional steelmaking processes utilizing common deoxidizers, use of scrap large in surface area and highly oxidized has extended the length of the period of reduction and resulted only in a limited yield of production. In contrast with this, according to the present invention, it has been found that an extremely high proportion of such low-grade scrap as turning chips can be used in combination with common scrap or pig iron with a satisfactory yield of production, which is made possible under the effect of CO and other reducing gases formed from heavy oil, kerosene or other reducing-gas-producing material initially conveniently laid in the furnace bottom, just like under the effect obtained when charcoal pig is used, which releases relatively large quantities of CO and hydrogen gases. That is to say, the hydrocarbon-base oil thus used forms as it is heated CO and other reducing gases which act fully to deoxidize any oxides contained in the turning chips and, even with introduction of any excess of oxygen gas for oxidation refining, effectively precludes excessive oxidation, which has previously been unavoidable and caused a considerable loss of iron in the form of $Fe_2O_3$. Moreover, the formation of reducing gases is effective to keep out any impurities otherwise remaining in steel as in the convention furnace operation, which has involved use of a considerable quantity of deoxidizer, and thus enables production of ingots free from defects such as blowholes and cracks.

The supply of heavy oil or the like carbon-base reducing-gas-forming agent can be made, for example, by laying it on the bottom of the furnace in the form of a mixture with coke dust, breeze, graphite or other appropriate solid carbon material, which not only serves to promote the reduction process but is effective to prevent the oil laid in the furnace bottom from rising afloat. It has been found that the same effect can also be obtained conveniently by pouring such oil as by hose onto the layer of turning chips of iron castings previously formed on the furnace bottom also to immerse such chips in the oil or encapsulating a mixture of the oil and solid carbon material and laying the capsules on the furnace bottom and subsequently charging the furnace with a large mass of turning chips and pig iron.

Finally, application of the present invention to the making of special or alloy steels will be described.

As is well known, generally in the making of alloy steels, alloying metal elements are added to the melt during the reducing period following the refining operation. Use of alloying metals in pure forms generally causes a high cost of production and a special group of materials known as ferroalloys including ferrochrome, ferromanganese, ferronickel and ferrovanadium constitute the major source of alloy additions for all grades of steel. Even ferroalloys, however, are, of course much more expensive than ores containing alloy elements. Under this situation, the present invention makes it feasible to produce alloy steels with high efficiency by making use of ore as a relatively cheap source of alloy addition, for example, utilizing common manganese ore in place of ferromanganese.

The alloy element ore is to be used in a calculated quantity in balance with the scrap to be charged and, in practice, such ore is mixed with an appropriate quantity of the scrap and to this mixture heavy oil, kerosene or other hydrocarbon-base reducing-gas-forming agent is added together with a solid carbon material such as coke dust or graphite. Subsequently, after the scrap and, if desired, pig iron have been charged in a normal manner, the charge is heated to melt by electric arcs or by combustion flames of fuel fed by burner means, as the case may be, with use of a sufficient supply of oxygen for efficient steel production. As with the cases of application of the present invention disclosed hereinbefore, the reducing gases such as CO and hydrogen gas formed from the heavy oil or other hydrocarbon-base agent as it is heated effectively deoxidize the oxides contained in the scrap and pig iron and any excessive oxidation incurring dissipation of iron in the form of $Fe_2O_3$ is precluded despite the supply of a large quantity of oxygen gas for oxidation refining, enabling efficient production with high yield. Also, in this case, impurities such as Ca and $Al_2O_3$ coming from the alloy element ore used are fully oxidized by the oxygen blown in to rise afloat and thus can be readily removed enabling production of extremely sound alloy steel free from any impurities, blowholes and other undesirable inclusions.

Coal or coal dust is suitable for use as the solid carbon material used in practice of the invention.

Use of the hydrocarbon base material in the steelmaking process has provided improved and unexpected benefits in the steelmaking process of the invention.

$Nm.^3$ means cubic meters at atmospheric pressure.

Some of the advantages and unobvious results from the present invention are:

(1) The cycle of discharging molten steel increases as much as to twice as fast in comparison with conventional processes.

(2) The efficiency for producing molten steel reaches to same efficiency as using new type U.H.P. transformer even if old type transformer having smaller capacity than said transformer is used in the electric furnace steel making process.

(3) The useful life of the furnace is increased since a reducing atmosphere within the furnace space produces small consumption of the furnace wall as well as of the electrode thereof.

(4) Electric power required amounts to only about 400–450 k.w.h. per ton of molten steel owing to shortening the melting time.

(5) One of the advantages of this invention lies in the use of ordinary steel making equipment without any modification thereof.

(6) Another advantage of this invention resides in removing oxygen gas and other gases contained in the molten metal by the reaction of reducing gas generated from a reducing-gas-forming agent.

(7) Further advantage of this invention resides in making ingots containing less non-metallic inclusions even if such deoxidizers as ferrosilicon, and ferromanganese are used for production of light grade steels, since said deoxidizers are reduced to metallic elements in the steel.

Therefore the ingot having good properties of elongation and reduction of area makes possible to produce high carbon steel and special steel.

(8) Further effects for rapid melting will be accomplished by using reducing pellets according to this invention.

It will be appreciated from the foregoing description that the objective of the present invention can be fully attained in its different applications and that result can be obtained without necessitating any modification of existing steelmaking equipment.

While several complete embodiments of the invention have been disclosed herein, it will be appreciated that modification of these particular embodiments of the invention may be resorted to without departing from the scope of the invention as defined in the appended claims.

What is claimed is:

1. A steelmaking process comprising the steps of charging the furnace with a charge scrap in an immersed or mixed state with a liquid hydrocarbon-base reducing-gas-forming agent ranging in amount between about 0.4 kg. and about 2.4 kg. per ton of charge and about 8—30 kg. of solid carbon material per ton of charge thereby to form a reducing atmosphere in the furnace in operation and blowing oxygen gas into the furnace at a rate ranging between about 10.8 $Nm.^3$ and about 45 $Nm.^3$ per ton of charge to expedite the melting process without involving any excessive oxidation in the metal bath.

2. A steelmaking process as in claim 1 including the step of selecting the reducing-gas-forming material from the class consisting of kerosene, light oil and heavy oil.

3. A steelmaking process as in claim 1 where the solid carbon material is from the class consisting of coal, coke, breeze and graphite.

4. A steelmaking process as in claim 1 including the step of starting the furnace charge to melt by heat derived from a conventional source of heat before the oxygen blowing is commenced.

5. A steelmaking process as in claim 1 comprising the steps of charging the furnace with a charge scrap in an immersed or mixed state with a liquid hydrocarbon-base reducing-gas-forming agent ranging in amount between about 1.0 kg. and about 1.6 kg. per ton of charge and from about 13–20 kg. of solid carbon material per ton of charge thereby and blowing oxygen gas into the furnace at a rate ranging between about 20 and about 25 $Nm.^3$ per ton to charge.

6. A steelmaking process adapted for the refining of low-grade scraps including turning chips, comprising the steps of charging the furnace with such scrap together with a hydrocarbon-base reducing-gas-forming agent from a class consisting of kerosene and heavy oil ranging in amount from about 0.4 kg. to about 2.4 kg. per ton of scrap and, after the scrap charge has started to melt under the heat of the furnace, blowing oxygen gas at a rate so as to provide about 10.8–45 $Nm.^3$ per ton of scrap of oxygen gas in the furnace, now filled with reducing gases formed from said hydrocarbon-base material during the process.

7. A steelmaking process as in claim 6 and comprising the steps of charging the furnace with said hydrocarbon-base reducing-gas-forming agent ranging in amount from about 1.0 kg. to about 1.6 kg. per ton of scrap and, blowing oxygen at a rate of from about 20 to about 25 $Nm.^3$ per ton of scrap of oxygen gas into the furnace.

8. A steelmaking process comprising the steps of charging the furnace with a charge scrap and providing a liquid hydrocarbon-base reducing-gas-forming agent in the furnace ranging in amount between about 0.4 kg. and about 2.4 kg. per ton of charge thereby to form a reducing atmosphere in the furnace in operation, and blowing oxygen gas into the furnace at a rate so as to provide a total of oxygen used ranging between about 10.8 $Nm.^3$ and about 45 $Nm.^3$ per ton of charge to expedite the melting process without involving any excessive oxidation in the metal bath.

9. A steelmaking process as in claim 8 including the step of providing from about 8 to about 30 kg. of solid carbon material per ton of charge in the furnace to aid in forming a reducing atmosphere therein.

(References on following page)

References Cited

UNITED STATES PATENTS

| | | | |
|---|---|---|---|
| 1,303,799 | 5/1919 | Jarvis | 75—44 |
| 1,763,248 | 6/1930 | Moore | 75—48X |
| 2,027,300 | 1/1936 | Claassen | 75—48 |
| 3,165,398 | 1/1965 | Shimamura et al | 75—48X |
| 3,174,847 | 3/1965 | Dagan | 75—43 |
| 3,207,596 | 9/1965 | Pinches | 75—60X |

FOREIGN PATENTS

| | | | |
|---|---|---|---|
| 657,973 | 10/1951 | Great Britain | 75—44 |
| 952,291 | 3/1964 | Great Britain | 75—51 |

L. DEWAYNE RUTLEDGE, Primary Examiner

G. K. WHITE, Assistant Examiner

U.S. Cl. X.R.

75—44S, 52, 60